Sept. 4, 1956 J. A. DENTON 2,761,473
MECHANISM FOR CONTROLLING THE FEED WORKS OF A RESAW
Filed Oct. 21, 1953 2 Sheets-Sheet 1
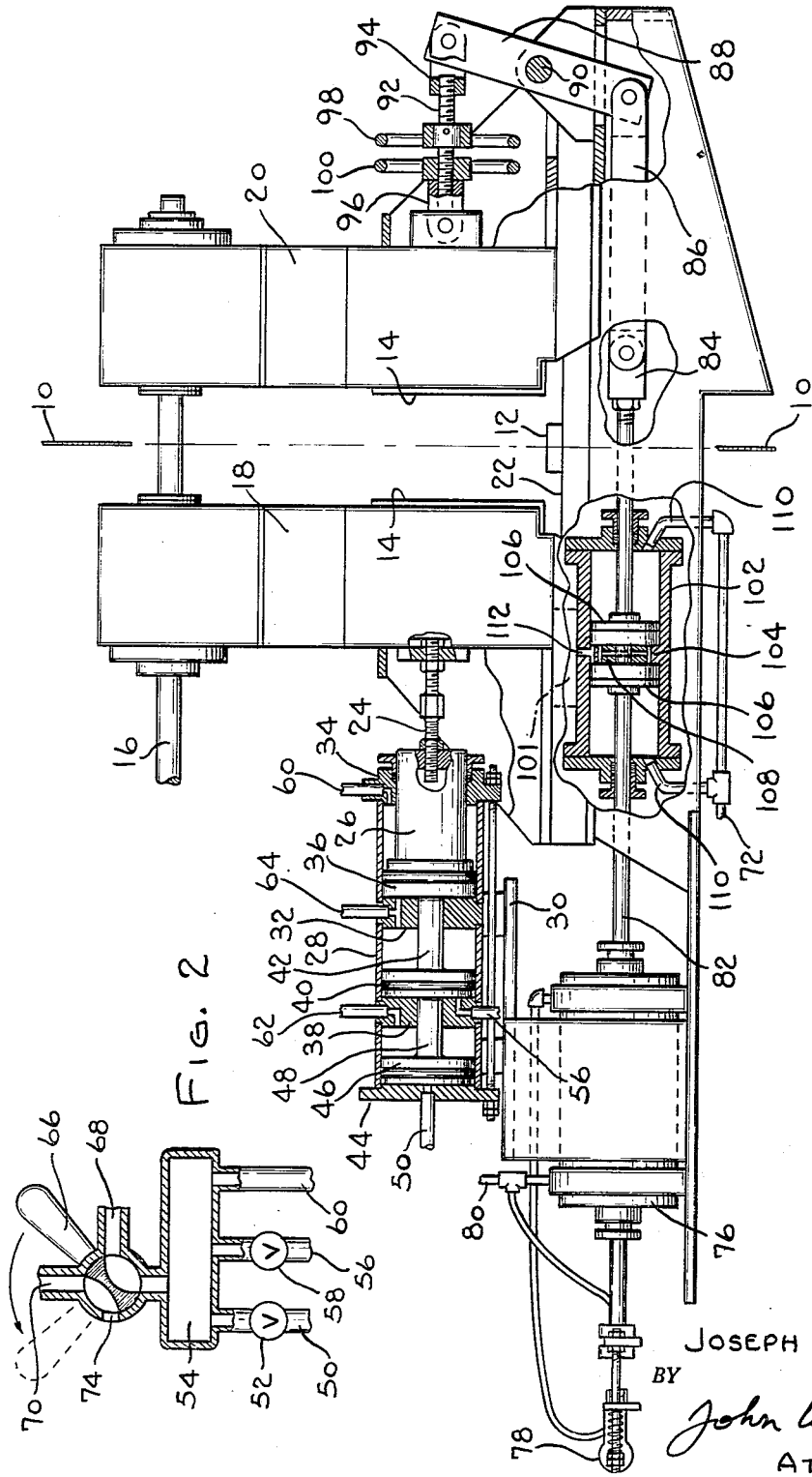
INVENTOR.
JOSEPH A. DENTON
BY
John W. Michael
ATTORNEY

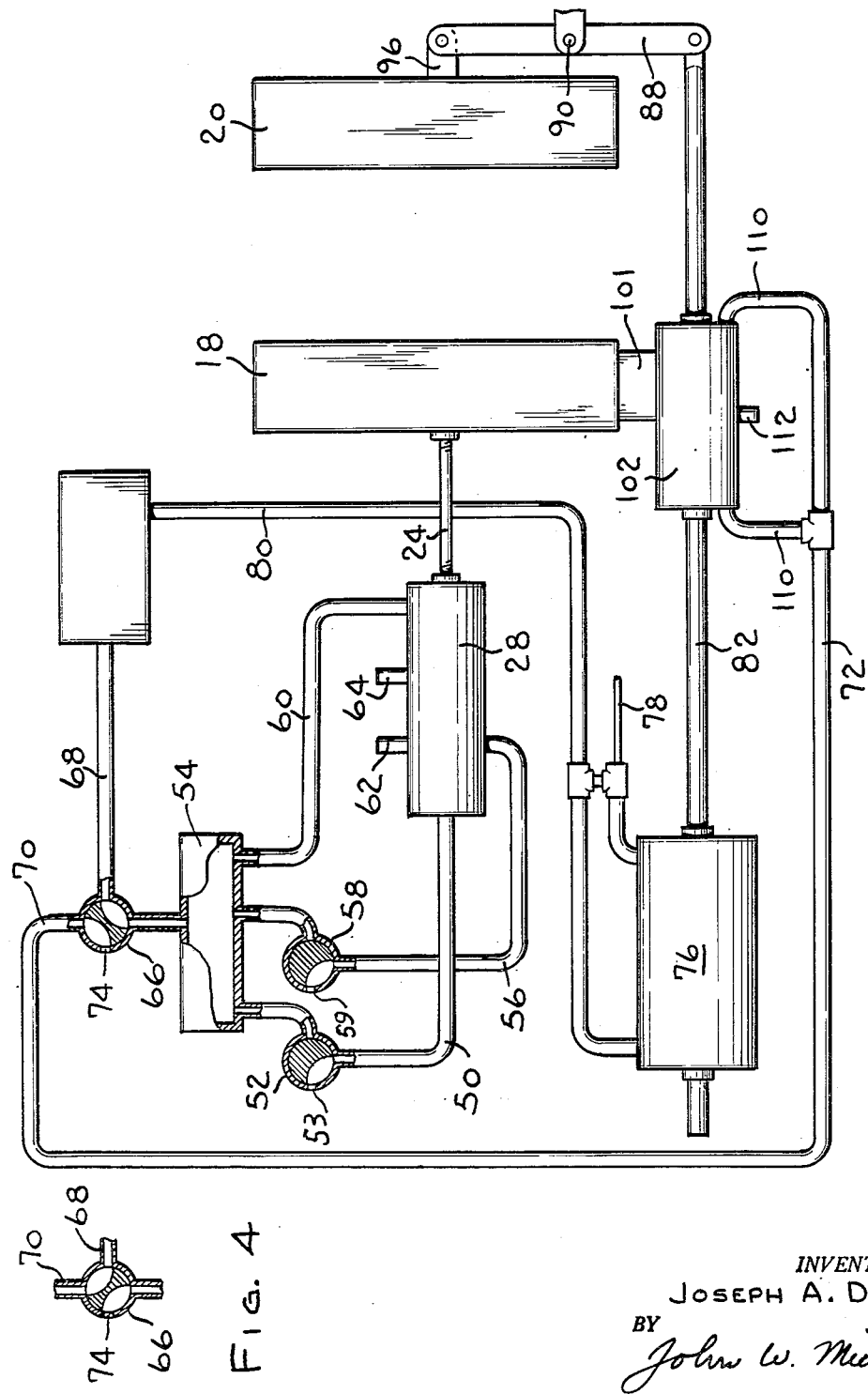

United States Patent Office 2,761,473
Patented Sept. 4, 1956

2,761,473

MECHANISM FOR CONTROLLING THE FEED WORKS OF A RESAW

Joseph A. Denton, Portland, Oreg., assignor to The Filer & Stowell Co., Milwaukee, Wis., a corporation of Wisconsin Application October 21, 1953, Serial No. 387,476

6 Claims. (Cl. 143—4)

This invention relates to the improvements in mechanism for controlling the feed works of a resaw.

The feed works of a resaw, both vertical and horizontal, customarily includes two relatively slidable sets of rollers which engage the cants or other pieces of lumber from opposite sides to feed them to the band saw. The cants are not uniformly dimensioned. Some must be center sawed, the cut being equidistant from each side even though the cant be tapered. Some must be side sawed, the cut being parallel to one side. In center sawing it is essential that both sets of feed rolls simultaneously move uniformly inwardly and outwardly with respect to the band saw. In side sawing one set of the feed rolls (sometimes referred to as set rolls) is fixed in its position relative to the saw, and the opposite set of feed rolls (sometimes referred to as press rolls) moves in and out with respect to the set rolls and the saw as the cant is sawed. Heretofore the mechanism for controlling the feed works required manual disconnection of the side sawing control elements and manual connection of the center sawing control elements. For example, the hand wheel operated gear and rack or the indexing lever system for setting the set roll would first have to be disconnected from the set roll assembly and then the linkage of the motion synchronizing mechanism connected to the press roll and the set roll. Such change-over consumes so much time that it is impractical in most mills which have tapered cants mixed in with straight cants. Also, the positioning of the set rolls by the above mentioned mechanisms is slow and subject to the error of human judgment.

It is an object of this invention therefore to provide a control mechanism for the feed works of resaws which does not have the foregoing disadvantages, and can change the feed works back and forth from the side sawing to center sawing quickly enough to handle cants which are mixed between tapered and straight.

Another object of this invention is to provide a control mechanism for the instantaneous setting of the set roll assembly at predetermined desired distances from the center line of the saw without relying on the skill of the operator in making the adjustment.

It is the essence of the present invention that these and other objects may be accomplished by the application of a multiple position set roll cylinder to the actuation of the set roll assembly and the use of a locking cylinder in the motion synchronizing mechanism between the set roll assembly and the press roll assembly, such cylinders being alternately energized by a control valve. When pressure is supplied to the set roll cylinder, pressure is cut off from the locking cylinder and vice versa. The selection of the positive positions of the set roll cylinder is controlled by separate valves and no human adjustment is required. A press cylinder controls the movement of the press roll assembly in side sawing and the movement of both press roll and set roll assemblies in center sawing.

For a more detailed description of this invention reference should be made to the following description of a specific embodiment read in connection with the accompanying drawing in which:

Fig. 1 is a view partly in side elevation and partly in section of a resaw feed works control mechanism embodying the present invention;

Fig. 2 is a schematic view of the valves for such control mechanism.

Fig. 3 is a diagrammatic view of the pressure circuit diagram for such control mechanism; and Fig. 4 is a schematic view of the manual control valve of Figs. 2 and 3 in the position shown in the broken line of Fig. 2.

The control mechanism illustrated in the drawing is applied to the set works forming part of a vertical resaw. The same control mechanism can also be applied to the feed works of a horizontal resaw or any other instrumentality for cutting timber. The band saw 10 is operated by power driven wheels and guided in the manner well known in this art. A lumber support 12 holds the lumber from below as it is fed to the saw by the fluted rolls 14. These rolls are carried in separate assemblies and driven through gearing from a common drive shaft 16. As viewed in the drawing the left hand assembly 18 will hereinafter be designated the inside or set roll assembly. The right hand assembly 20 will be hereinafter designated the outside or press roll assembly. These assemblies are constructed in a manner well known in this art. Each assembly is slidably mounted on a guide rail 22 and can move relative to the common drive shaft 16 to establish adjustment of one assembly relative to the other or the adjustment of either assembly relative to the band saw 10.

The set roll assembly 18 is connected by a longitudinally adjustable piston rod 24 to the enlarged ram 26 of a multiple position set roll cylinder 28 rigidly mounted on a support plate 30 attached to the resaw frame. The multiple position set roll cylinder 28 is made of three cylinders axially aligned. The rearmost (to the right) cylinder is formed by a partition 32 and the rear head 34. Operating in this rear cylinder is a piston 36, the rear face of which is connected to the ram 26. The ram cuts down the effective pressure area of this face of the piston and hence when the same pressure is applied to both sides of the piston 36 it will move rearwardly. However, when such pressure is removed from the forward face of such piston it will move back to its forward position. The middle cylinder, of shorter length than the rearmost cylinder, is formed by the partition 32 and a partition 38, a piston 40 is movable in the intermediate cylinder and has a rearwardly projecting piston rod 42 projecting through the partition 32 and engageable with the piston 36. When pressure is applied to the forward side of piston 40 it will move to the rear end of the intermediate cylinder and the piston rod 42 will push the piston 36 a predetermined distance rearwardly in the rear cylinder. The forward cylinder, of shorter length than the intermediate cylinder, is formed by the partition 38 and the front head 44. In the forward cylinder is a piston 46 having a connecting piston rod 48 projecting through the partition 38 and engageable with the forward face of the piston 40. When pressure is applied to the forward face of piston 46 it will move to the rear of the first cylinder and cause the piston 40 in the intermediate cylinder to move a predetermined distance toward the rear at the same time moving the piston 36 the same distance towards the rear. The front head 44 has an inlet connected by a conduit 50 and a control valve 52 to a manifold 54. The partition 38 has an inlet connected by a conduit 56 and a control valve 58 to such manifold. The rear head 34 has an inlet connected by the conduit 60 directly to the manifold 54. The forward cylinder has a vent 62 leading in the partition 38. The intermediate cylinder and the rear cylinder have a common vent 64 in the partition 32. A manual control valve 66 shown schematically in Fig. 2 has an intake 68 connected with the source of fluid pressure. In the position shown in the full lines the intake 68 is connected to the manifold 54 to make the set roll cylinder 28 operative. When either of the valves 52 and 58 are opened, pressure will be supplied to the forward face of the respective ones of pistons 46 and 40. The areas of these pistons being in excess of the area of the rear face of piston 36, the force supplied thereby will overcome the force in the rear cylinder and the set roll assembly 18 will immediately move the length of one or the other of the forward or intermediate cylinders. When either of the valves 52 and 58 are closed the pressure in the rear cylinder will return the set roll assembly 18 to the position shown in the drawing, as such valves 52 and 58 have suitable vents 53 and 59 (as is well known to those skilled in this art) in the closed position to release pressure from the forward and intermediate cylinders. The adjustable rod 24 is used to accurately position the edge of the rolls 14 in the assembly 18 with respect to the center line of the saw 10. Readjustment may be easily made to accommodate different sized saws. In order to select the size of the thickness to be side sawed from a cant the operator moves the valve 66 to the side saw position shown in the full lines of Fig. 2 and opens either valve 52 or 58. For example valve 52 can set the assembly 18 for rough 2" cut and valve 58 set such assembly for a rough 1" cut. The operator need not read a dial and pointer or other visual indication to properly set such assembly. When the valve 66 is moved to the position shown in the broken lines, the intake 68 will be connected to an outlet 70 controlling the center saw operation and disconnected from the manifold 54 which will then be vented through the outlet 74 to make the side sawing mechanism inoperative.

The sliding movement of the press roll assembly 20 in both side sawing and center sawing for adjustment to vary sized cants and for application of continuous pressure on the cant is effected by a press cylinder 76 controlled by a manually operable slide 78 of a control valve. The press cylinder is connected by conduit 80 to the same source of fluid pressure as the set roll cylinder. The construction and operation of such press cylinder is fully described in U. S. Patent No. 2,599,899 dated June 10, 1952, and entitled "Servo-Motor" and only its resultant function will be described. Movement of the slide 78 toward the right will cause a piston within the press cylinder 76 under continuing pressure to move a piston rod 82 toward the right. Movement of such slide to the left will cause such rod to move to the left. The piston rod 82 is connected by a coupling 84 and link 86 to the lower end of a rocker lever 88 pivoted to the slide frame by pivot 90. The upper end of such rocker lever is connected to the press roll assembly 20 by an adjusting stud 92 having one end threaded in clevis 94 and the other end threaded in a coupling 96. Both threads of the stud 92 are of the same hand but of different pitch thus providing a micrometer-like adjustment for centering the press roll assembly 20 with respect to the saw 10 and the set roll assembly 18. The stud 92 is rotated by a hand wheel 98 and locked by another hand wheel 100. The rocker lever 88 reverses the direction of motion of the press roll assembly 20 with respect to the piston rod 82 and when such rod is moved toward the right such assembly will move to the left and vice versa. The amount of force which can be applied to the cant by the operation of press cylinder 76 is determined by the pressure in the source and the dimension of such press cylinder. Such force is sufficient to drive the cant without injury thereto.

To operate the feed works for center sawing both the assemblies 18 and 20 must move simultaneously uniformly with respect to the center line of the saw 10. To accomplish this it is only necessary to lock the assembly 18 to the piston rod 82. Hence when such rod moves to the right it will carry the set roll assembly 18 to the right at the same speed as the press roll assembly 20 is moved to the left under the influence of the rocker lever 88. To effectuate an immediate locking and unlocking of the set roll assembly 18 to the piston rod 82 there is rigidly secured to the assembly 18 by mounting means 101 a locking cylinder 102 through the heads of which the piston rod 82 slides. The locking cylinder 102 has centrally disposed therein an inner ring 104. To each side of this ring are pistons 106 which freely float on the piston rod 82 and operate in such cylinder. Between the pistons 106 such rod has a collar or other abutment 108 secured thereto. When the pistons 106 are forced inwardly into engagement with the ring 104 they engage and center at such ring the collar 108. Each head of the cylinder is provided with an inlet connected by a conduit 110, the conduit 72, and the outlet 70 of the valve 66 to the source of fluid pressure. A central vent 112 opens from the inner ring 104 to relieve pressure between the pistons 106. When the valve 66 is moved to the position shown in Fig. 4 and in the broken lines in Fig. 2, the set roll cylinder 28 becomes inoperative and the pressure is supplied to the locking cylinder 102 at both ends. This causes the pistons 106 to lock the collar 108 as described. This immediately locks the set roll assembly 18 to the piston rod 82, at a position properly adjusted with respect to the press rolls 20 by the stud 92. Such adjusted position will be repeatedly assumed on each energization of the locking cylinder. When so locked both assemblies 18 and 20 will move toward and away from each other at a uniform rate of travel so that they will always be equidistant from the center line of the saw 10. To re-arrange the feed works for side sawing the valve 66 is flipped to the position shown in the full lines of Fig. 2 which immediately unlocks the locking cylinder 102, venting it at both ends and allowing the piston 106 to float freely within such locking cylinder. Such movement of the valve 66 also simultaneously makes the set roll cylinder 28 operative and settable under control of the valves 52 and 58. In center sawing pressure is supplied to both sides of the cant by the assemblies 18 and 20 through the press cylinder 76. As the slide 78 is moved to the left these assemblies will be drawn apart. As the slide 78 is moved to the right such assemblies will be brought together. Thus immediate change-over is accomplished between side sawing and center sawing under the control of a feed works operator without the requirement of any skillful judgment other than the selecting of which size of several cuts shall be made in a cant approaching the feed works.

While there is shown a particular embodiment of this invention, many modifications may be made and it is contemplated that the following claims cover any such modifications as forward in the spirit and scope of this invention.

I claim:

1. Resaw feed works having slidably mounted set roll and press roll assemblies, adjusting means for said set roll assembly, means for applying clamping pressure on said press roll assembly, interconnecting means for said set roll and press roll assemblies to provide synchronous movement thereof with respect to the midpoint between said assemblies, said interconnecting means including an engaging device movable with one of said assemblies and an engageable member movable with the other of said assemblies, said member being movable with respect to said engaging device when inoperative and held by said engaging device when operative whereby said interconnecting means may be made alternately operative and inoperative, and control means for rendering said adjusting means inoperative as said engaging device is made operative and vice versa.

2. Resaw feed works as claimed in claim 1 in which said adjusting means includes multiple cylinders and pistons selectively energized to positively position said set roll assembly at predetermined positions, said engaging device is a single cylinder with floating pistons movable toward each other upon energization of said cylinder, said engageable member is a piston rod on which said pistons freely move, said rod having an abutment thereon between said floating pistons gripped by pistons when said cylinder is energized, and said control means includes a source of fluid energy and a valve for alternately connecting said multiple cylinders and said single cylinder to said source.

3. In a feed works having feed rolls movable relative to each other to engage therebetween material to be fed to an instrumentality, a first cylinder having a piston operatively connected to a first feed roll to move said roll to a predetermined setting and hold said roll in such setting upon application of fluid pressure, fluid pressure operated means for pressing a second of said rolls toward said first roll, a rocking lever having one end movable with said second roll, a second cylinder movable with said first roll and a piston rod in said second cylinder movable with said second roll and the other end of said rocking lever, a pair of pistons in said second cylinder movable with respect to said piston rod, an abutment on said piston rod between said pistons, said pistons gripping said abutment therebetween when fluid pressure is applied to said second cylinder at the ends thereof, a source of fluid pressure, and a valve operable to connect said source of fluid pressure alternately to first cylinder and said second cylinder.

4. The combination as claimed in claim 3 including a manual vernier adjustment between said first mentioned piston and said one of said feed rolls and a second manual vernier adjustment between said one end of said rocking lever and said one of said rolls.

5. The combination as claimed in claim 3 in which said first mentioned piston has an enlarged ram connecting it with said first roll to make the rear side of said piston of much smaller pressure receiving area than the front side, and said source of fluid is effective on both sides of said first mentioned piston so that upon removal of said pressure from the front side of said piston it will be moved back from said predetermined setting.

6. In a feed works, means for interconnecting opposing work engaging members for simultaneous movement in opposite directions, said means including a pair of engageable and disengageable motion transmission members, and means for disengaging said transmission members and simultaneously locking one of said opposing work engaging members.

References Cited in the file of this patent

UNITED STATES PATENTS

| | | |
|---|---|---|
| 1,561,341 | Martin | Nov. 10, 1925 |
| 1,834,922 | Abercrombie | Dec. 8, 1931 |
| 2,572,385 | Price | Oct. 23, 1951 |
| 2,599,899 | Denton | June 10, 1952 |